(No Model.)
P. BOUCK.
DRAFT EQUALIZER.
No. 473,902. Patented May 3, 1892.
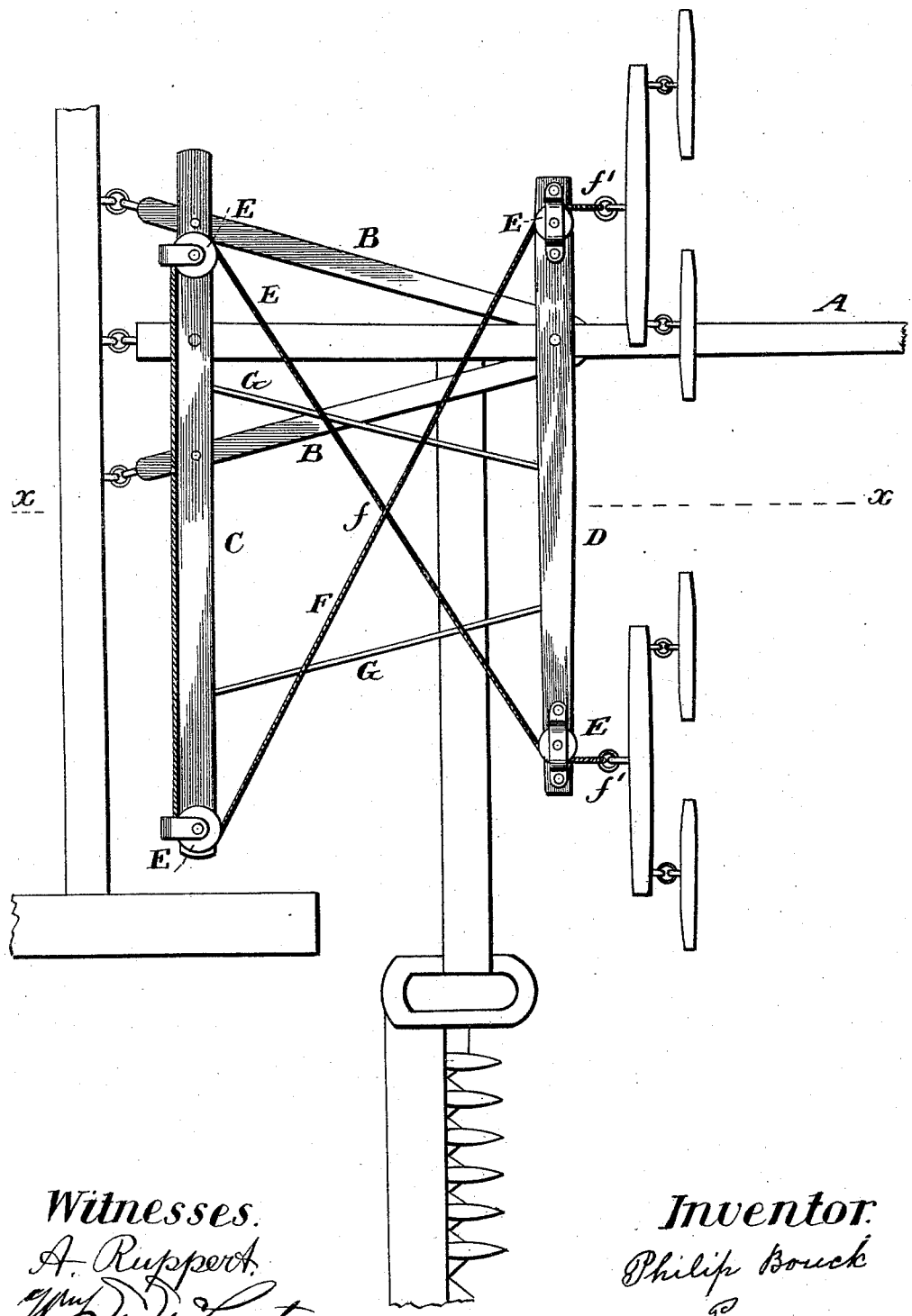
Witnesses.
A. Ruppert.
Wm. P. McCarty
Inventor.
Philip Bouck
Per
Thomas P. Simpson
Atty

UNITED STATES PATENT OFFICE.

PHILIP BOUCK, OF TRENT, SOUTH DAKOTA.

DRAFT-EQUALIZER.

SPECIFICATION forming part of Letters Patent No. 473,902, dated May 3, 1892.

Application filed January 13, 1892. Serial No. 417,955. (No model.)

*To all whom it may concern:*

Be it known that I, PHILIP BOUCK, a citizen of the United States, residing at Trent, in the county of Moody and State of South Dakota, have invented certain new and useful Improvements in Four-Horse Equalizers for Harvesters and other Vehicles; and I do hereby declare the following to be a full, clear, and exact description of the invention, such as will enable others skilled in the art to which it appertains to make and use the same.

The special object of my invention is to combine with a harvester some device by which not only will the strain be equalized on the four horses generally used, but also the side draft avoided entirely or reduced to a minimum.

The drawing is a plan view of a portion of a harvester with my invention applied thereto.

In the drawing, A represents the harvester-pole, and B B the hounds, while C D are two preferably parallel cross-bars, which are made fast to said pole and hounds. On each of these cross-bars I arrange two pulleys E E about five feet and three inches apart, and around the pulleys pass a rope chain or wire cable F, with its two ends crossing each other at $f$, and provided with the terminal rings $f'\,f'$. To each of the rings is attached a doubletree carrying two singletrees for a pair of horses, so that the two double teams may have the strain equally divided between them.

G G are counter-braces.

The effect resulting from the arrangement of the chain or cable F around the pulleys E E and so as to cross at $f$ is to bring the line of draft on the dotted line $x\,x$ and between the two teams or pairs of horses. Hence the latter get a straight pull, the side draft is avoided, and the horses work to the greatest possible advantage; also, the swaths of grain are more evenly cut and the harvester moves along more smoothly, no lateral wobbling being any longer perceptible.

My invention was used by myself and six of my neighbors during the last harvest and found fully to accomplish the end in view.

Having thus described all that is necessary to a full understanding of my invention, what I claim as new, and desire to protect by Letters Patent, is—

A draft-equalizer comprising two cross-bars rigidly attached to the pole, pulleys secured to said cross-bars, braces between the cross-bars, and a single rope or cable passing around the pulleys on the rear cross-bar, crossed and passed through the pulleys on the front cross-bars and doubletrees attached to the free ends of the rope or cable, substantially as described.

In testimony whereof I affix my signature in presence of two witnesses.

PHILIP BOUCK.

Witnesses:
NIELS H. PEDERSON,
O. I. HUSEBÖE.